US012759499B2

(12) United States Patent
Masuda et al.

(10) Patent No.: US 12,759,499 B2
(45) Date of Patent: Oct. 13, 2026

(54) AIR SUPPLY DEVICE

(71) Applicant: AISIN CORPORATION, Kariya (JP)

(72) Inventors: Satoshi Masuda, Kariya (JP); Tomokazu Seki, Kariya (JP); Yasuhito Kurematsu, Kariya (JP); Reiji Suzuki, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/876,378

(22) PCT Filed: Jul. 14, 2023

(86) PCT No.: PCT/JP2023/026092

§ 371 (c)(1),
(2) Date: Dec. 18, 2024

(87) PCT Pub. No.: WO2024/075366

PCT Pub. Date: Apr. 11, 2024

(65) Prior Publication Data

US 2025/0368159 A1 Dec. 4, 2025

(30) Foreign Application Priority Data

Oct. 7, 2022 (JP) ................................ 2022-162246

(51) Int. Cl.
*B60R 21/276* (2006.01)
*B60R 21/207* (2006.01)
*B60R 21/26* (2011.01)

(52) U.S. Cl.
CPC .......... *B60R 21/276* (2013.01); *B60R 21/207* (2013.01); *B60R 2021/26094* (2013.01)

(58) Field of Classification Search
CPC ................ B60R 21/276; B60R 21/207; B60R 2021/26094; B60N 2/90
See application file for complete search history.

(56) References Cited

U.S. PATENT DOCUMENTS

| | | | | |
|---|---|---|---|---|
| 5,669,410 | A | 9/1997 | Furuya | |
| 7,052,037 | B2 * | 5/2006 | Nakayasu | B60R 21/268 280/736 |
| 8,820,245 | B1 * | 9/2014 | Quioc | B60R 21/2644 102/530 |

(Continued)

FOREIGN PATENT DOCUMENTS

| | | |
|---|---|---|
| CN | 112353597 A | 2/2021 |
| JP | 3015562 U | 9/1995 |

(Continued)

OTHER PUBLICATIONS

International Search Report for PCT/JP2023/026092, dated Sep. 19, 2023.

*Primary Examiner* — Patrick C Williams
(74) *Attorney, Agent, or Firm* — Sughrue Mion, PLLC

(57) ABSTRACT

An air supply device includes a pump that delivers air, a connecting flow channel that connects the pump to an air bag, and a pressure reducing joint that reduces pressure of air supplied from the pump to the air bag. The pressure reducing joint includes an internal flow channel constituting a part of the connecting flow channel, and an exhaust flow channel that constantly connects the internal flow channel to the atmosphere and discharges a part of the air flowing through the internal flow channel to the atmosphere.

6 Claims, 2 Drawing Sheets

(56) References Cited

U.S. PATENT DOCUMENTS

| | | | | |
|---|---|---|---|---|
| 2002/0175508 | A1* | 11/2002 | Hess | B60R 21/261 280/740 |
| 2007/0164546 | A1* | 7/2007 | Kai | B60R 21/2346 280/730.2 |
| 2017/0088029 | A1 | 3/2017 | Mizoi et al. | |
| 2019/0283639 | A1 | 9/2019 | Mizoi et al. | |
| 2021/0146814 | A1 | 5/2021 | Mizoi et al. | |
| 2021/0276458 | A1 | 9/2021 | Fujii et al. | |
| 2023/0278474 | A1 | 9/2023 | Mizoi et al. | |
| 2024/0190313 | A1 | 6/2024 | Mizoi et al. | |

FOREIGN PATENT DOCUMENTS

| | | | |
|---|---|---|---|
| JP | 2018-058511 | A | 4/2018 |
| JP | 2021-049993 | A | 4/2021 |

* cited by examiner

AIR SUPPLY DEVICE

CROSS REFERENCE TO RELATED APPLICATIONS

This application is a National Stage of International Application No. PCT/JP2023/026092 filed Jul. 14, 2023, claiming priority based on Japanese Patent Application No. 2022-162246 filed Oct. 7, 2022, the entire contents of which are incorporated in their entirety.

TECHNICAL FIELD

The present disclosure relates to an air supply device.

BACKGROUND ART

Conventionally, a vehicle seat that can adjust a seating posture of a user has been known. For example, a vehicle seat described in Patent Literature 1 includes a compressor that delivers air, an air bag that supports a waist of a user, an air supply channel that connects the compressor to the air bag, an electromagnetic valve provided in the air supply channel, and a sensor that acquires information regarding a seating posture of the user. The vehicle seat opens and closes the electromagnetic valve while the compressor is driven on the basis of a control amount corresponding to a sensor value. In this manner, the vehicle seat supplies air to the air bag.

CITATIONS LIST

Patent Literature

Patent Literature 1: JP 2021-49993 A

SUMMARY OF THE DISCLOSURE

Technical Problems

The vehicle seat as described above adjusts an amount of air supply to the air bag by opening and closing the electromagnetic valve. There has been room for improvement for the vehicle seat in terms of simplifying the configuration of the device.

Solutions to Problems

An aspect of the present disclosure provides an air supply device that supplies air to an air bag. The air supply device includes a pump that delivers air, a connecting flow channel that connects the pump to the air bag, and a pressure reducing joint that reduces pressure of air supplied from the pump to the air bag. The pressure reducing joint includes an internal flow channel constituting a part of the connecting flow channel, and an exhaust flow channel that constantly connects the internal flow channel to the atmosphere and discharges a part of the air flowing through the internal flow channel to the atmosphere.

DESCRIPTION OF EMBODIMENTS

Hereinafter, a vehicle seat including an air supply device will be described.

Configuration of Present Embodiment

Figure 1:
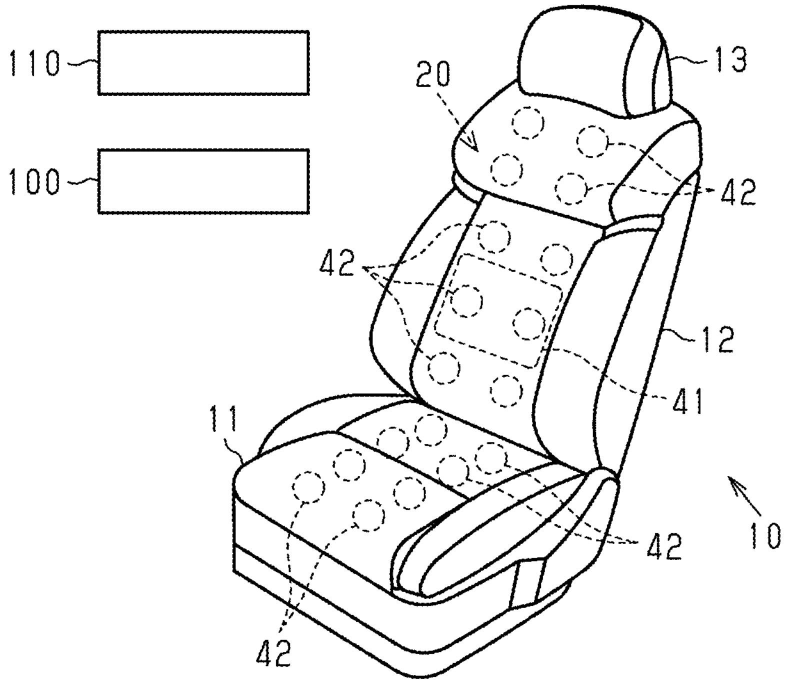
FIG. 1 is a perspective view of a vehicle seat including an air supply device.
Figure 2:
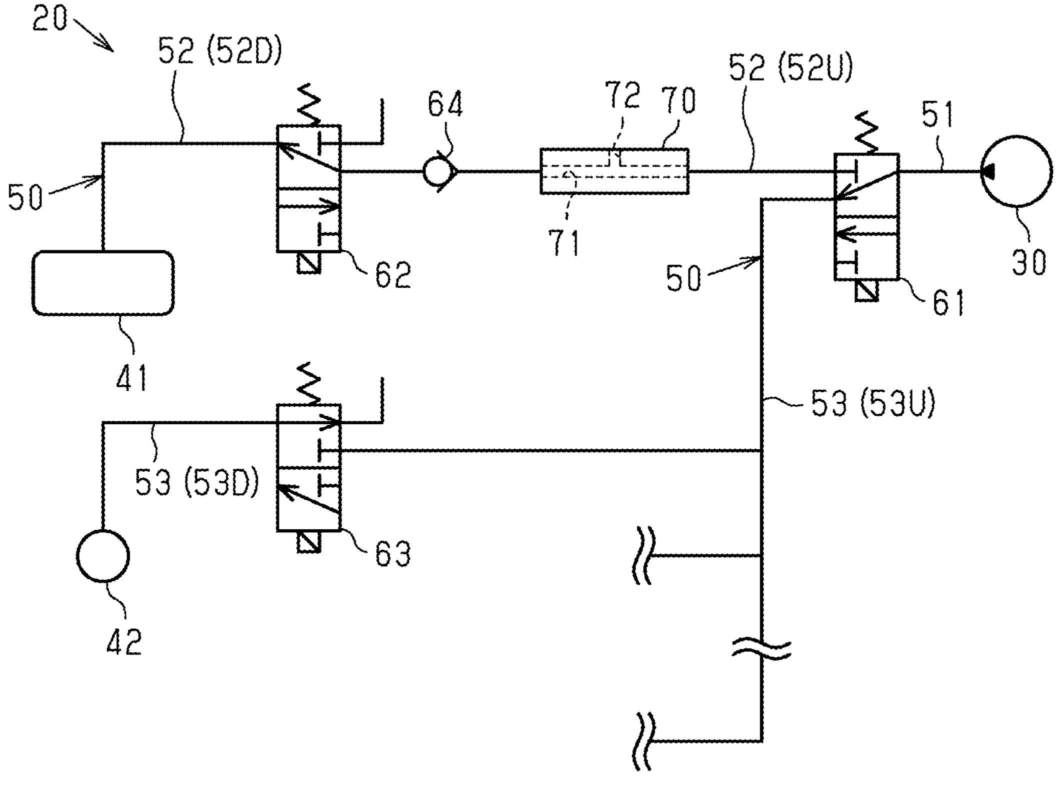
FIG. 2 is a schematic view illustrating a schematic configuration of the air supply device in FIG. 1.

As illustrated in FIGS. 1 and 2, a vehicle seat 10 includes a seat cushion 11, a seat backrest 12, a headrest 13, an air supply device 20, an operation unit 100, and a control unit 110. The vehicle seat 10 corresponds to, for example, a driver seat, a passenger seat, and a rear seat of the vehicle.

Seat Cushion 11, Seat Backrest 12, and Headrest 13

As illustrated in FIG. 1, the seat cushion 11 is a portion that supports the buttocks of a user. The seat backrest 12 is a portion that supports the back of the user. The headrest 13 is a portion that supports the head of the user. Although not illustrated, each of the seat cushion 11 and the seat backrest 12 includes a seat frame constituting a skeleton, a cushion spring supported by the seat frame, a cushion pad attached to the cushion spring, and a skin covering the cushion pad. The headrest 13 includes a bar-shaped stay, a cushion pad attached to the stay, and a skin covering the cushion pad.

Air Supply Device 20

As illustrated in FIGS. 1 and 2, the air supply device 20 includes a pump 30, a first air bag 41, a plurality of second air bags 42, a connecting flow channel 50, a switching valve 61, an auxiliary valve 62, a plurality of regulating valves 63, a check valve 64, and a pressure reducing joint 70. Note that FIG. 2 illustrates one of the plurality of second air bags 42 and one of the plurality of regulating valves 63.

Pump 30

It is sufficient as long as the pump 30 is an electric pump using an electric motor as a drive source. The pump 30 delivers air by driving the electric motor on the basis of the electric power supplied from a battery. The pump 30 is preferably accommodated in, for example, the seat cushion 11 or the seat backrest 12.

Air Bag

The first air bag 41 is a support air bag that supports the waist of the user. Therefore, the size of the first air bag 41 is preferably a size corresponding to the waist of the user. The first air bag 41 is accommodated at a position corresponding to the waist of the user in the seat backrest 12.

The second air bag 42 is a refreshing air bag that massages a portion where the user is in contact with the seat cushion 11 and the seat backrest 12. In the present embodiment, the size of the second air bag 42 is smaller than the size of the first air bag 41. The plurality of second air bags 42 are arranged in an aligned state over the seat backrest 12 and the seat cushion 11. In other words, the plurality of second air bags 42 are accommodated at a position corresponding to the back of the user in the seat backrest 12 and a position corresponding to the buttocks of the user in the seat cushion 11. The arrangement of the plurality of second air bags 42 illustrated in FIG. 1 is an example.

The plurality of second air bags 42 are located closer to the skin of the seat backrest 12 than the first air bag 41 in the thickness direction of the seat backrest 12. Therefore, a part of the second air bags 42 are located between the skin of the seat backrest 12 and the first air bag 41.

Connecting Flow Channel 50

The connecting flow channel 50 is, for example, a flow channel provided in a resin tube having elasticity. The connecting flow channel 50 may be a flow channel provided inside the resin molded article. As illustrated in FIG. 2, the connecting flow channel 50 includes a supply flow channel 51, a first flow channel 52, and a second flow channel 53.

The supply flow channel 51 connects the pump 30 to the switching valve 61. The first flow channel 52 connects the switching valve 61 to the first air bag 41. The first flow channel 52 includes a first upstream flow channel 52U connecting the switching valve 61 to the auxiliary valve 62, and a first downstream flow channel 52D connecting the auxiliary valve 62 to the first air bag 41. The second flow channel 53 connects the switching valve 61 to the plurality of second air bags 42. The second flow channel 53 includes a second upstream flow channel 53U connecting the switching valve 61 to the plurality of regulating valves 63, and a second downstream flow channel 53D connecting the plurality of regulating valves 63 to the plurality of second air bags 42.

In other words, the upstream end of the supply flow channel 51 is connected to the pump 30, and the downstream end of the supply flow channel 51 is connected to the switching valve 61. The upstream end of the first flow channel 52 is connected to the switching valve 61, and the downstream end of the first flow channel 52 is connected to the first air bag 41. The upstream end of the second flow channel 53 is connected to the switching valve 61, and the downstream end of the second flow channel 53 is connected to the plurality of second air bags 42 which is an air supply target different from the first air bag 41.

Valve

The switching valve 61, the auxiliary valve 62, and the plurality of regulating valves 63 are each an electromagnetic valve including a spring and an electromagnet. In a case where the electromagnetic valve is not energized, an amount of elastic deformation of the spring decreases, and in a case where the electromagnetic valve is energized, the amount of elastic deformation of the spring increases.

The switching valve 61 switches the connection state of the supply flow channel 51 between a state in which the supply flow channel 51 is connected to the first upstream flow channel 52U and a state in which the supply flow channel 51 is connected to the second flow channel 53. That is, the switching valve 61 switches the connection destination of the supply flow channel 51 to the first flow channel 52 or the second flow channel 53. In the case of not being energized, the switching valve 61 connects the supply flow channel 51 to the second flow channel 53. In the case of being energized, the switching valve 61 connects the supply flow channel 51 to the first upstream flow channel 52U.

The auxiliary valve 62 switches the connection state of the first downstream flow channel 52D between a state in which the first downstream flow channel 52D is connected to the first upstream flow channel 52U and a state in which the first downstream flow channel 52D is connected to the atmosphere. In the case of not being energized, the auxiliary valve 62 connects the first downstream flow channel 52D to the first upstream flow channel 52U. In the case of being energized, the auxiliary valve 62 connects the first downstream flow channel 52D to the atmosphere.

The number of the regulating valves 63 is the same as the number of the second air bags 42. Each of the regulating valves 63 switches the connection state of the corresponding second downstream flow channel 53D between a state in which the second downstream flow channel 53D is connected to the corresponding second upstream flow channel 53U and a state in which the second downstream flow channel 53D is connected to the atmosphere. In the case of not being energized, the regulating valve 63 connects the corresponding second downstream flow channel 53D to the atmosphere. In the case of being energized, the regulating valve 63 connects the corresponding second downstream flow channel 53D to the second upstream flow channel 53U.

The check valve 64 is provided between the pressure reducing joint 70 and the auxiliary valve 62 in the first upstream flow channel 52U. The check valve 64 allows the flow of air from the pressure reducing joint 70 toward the first air bag 41, and meanwhile, restricts the flow of air from the first air bag 41 toward the pressure reducing joint 70.

Pressure Reducing Joint 70

As illustrated in FIG. 2, the pressure reducing joint 70 is provided between the switching valve 61 and the check valve 64 in the first flow channel 52.

Figure 3:
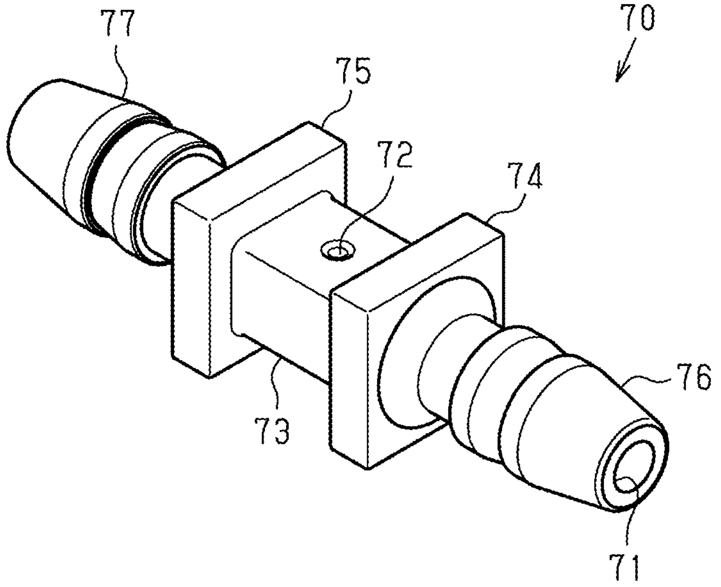
FIG. 3 is a perspective view of a pressure reducing joint of the air supply device in FIG. 2.
Figure 4:
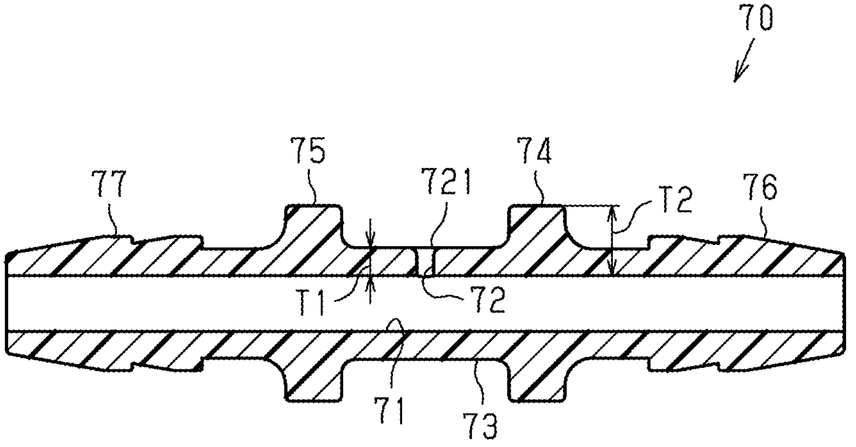
FIG. 4 is a cross-sectional view of the pressure reducing joint in FIG. 3.

As illustrated in FIGS. 3 and 4, the pressure reducing joint 70 is constituted of, for example, resin material. The pressure reducing joint 70 has a symmetrical shape. The pressure reducing joint 70 includes an internal flow channel 71 and an exhaust flow channel 72. In addition, the pressure reducing joint 70 includes a main body 73, a first base 74, a second base 75, a first connecting portion 76, and a second connecting portion 77.

The internal flow channel 71 constitutes a part of the first flow channel 52. The internal flow channel 71 penetrates the pressure reducing joint 70 in one direction. In the following description, an extending direction of the internal flow channel 71 is referred to as an axial direction. The internal flow channel 71 has a circular cross-sectional shape. The exhaust flow channel 72 connects the internal flow channel 71 to the atmosphere. The exhaust flow channel 72 has a circular cross-sectional shape. The flow channel cross-sectional area of the exhaust flow channel 72 is smaller than the flow channel cross-sectional area of the internal flow channel 71.

The main body 73 is located at the center in the axial direction of the pressure reducing joint 70. The main body 73 has a rectangular parallelepiped shape. In the main body 73, the internal flow channel 71 passes in the axial direction, and also, the exhaust flow channel 72 passes in a direction orthogonal to the axial direction. That is, the exhaust flow channel 72 extends in a direction intersecting the internal flow channel 71. An opening edge 721 on the atmosphere side of the exhaust flow channel 72 is rounded. The opening edge 721 has, for example, a circular arc cross section. Therefore, at a portion near the opening on the atmosphere side, the flow channel cross-sectional area of the exhaust flow channel 72 gradually increases toward the opening edge 721. Note that, in the present embodiment, because the pressure reducing joint 70 is a resin molded article, the opening edge 721 is molded to have a rounded shape, but this does not mean that the opening edge is chamfered after molding. In addition, because the cross-sectional shape of the exhaust flow channel 72 is circular, the shape of the opening on the atmosphere side of the exhaust flow channel 72 is also circular. In the main body 73, a portion where the exhaust flow channel 71 is opened is referred to as an exhaust flow channel opening portion.

The first base 74 and the second base 75 have a rectangular plate shape. The first base 74 and the second base 75 have a predetermined thickness in the axial direction. The first base 74 and the second base 75 have the internal flow channel 71 passing therethrough in the axial direction. The first base 74 is connected to a first end in the axial direction of the main body 73, and the second base 75 is connected to a second end in the axial direction of the main body 73.

As illustrated in FIG. 4, in the direction orthogonal to the axial direction, a thickness T1 of a wall of the main body 73 is smaller than a thickness T2 of walls of the first base 74 and the second base 75. Therefore, the exhaust flow channel opening portion of the main body 73 is recessed further toward the internal flow channel 71 than the first base 74 and the second base 75 adjacent to the exhaust flow channel opening portion in the axial direction. Although not illustrated, in the main body 73, the thickness of the wall where the exhaust flow channel 72 is not opened is also thinner than the thickness of the walls of the first base 74 and the second base 75. In this respect, it can be said that the main body 73 is entirely recessed further toward the internal flow channel 71 than the first base 74 and the second base 75.

The first connecting portion 76 and the second connecting portion 77 have a columnar shape. The first connecting portion 76 and the second connecting portion 77 have the internal flow channel 71 passing therethrough. The first connecting portion 76 extends from the first base 74 in the axial direction. The second connecting portion 77 extends from the second base 75 in the axial direction. The first connecting portion 76 and the second connecting portion 77 have the first upstream flow channel 52U connected thereto. In actuality, the first connecting portion 76 and the second connecting portion 77 have a tube constituting the first upstream flow channel 52U connected thereto. At this time, the tube is preferably inserted into the first connecting portion 76 until the tube comes into contact with the first base 74. In addition, it is preferable that a barb is provided in the first connecting portion 76 to make the tube not easily come off from the first connecting portion 76. This similarly applies to the second connecting portion 77.

Operation Unit 100

The operation unit 100 is operated by the user to operate the air supply device 20. The operation unit 100 may be a remote controller or may be provided on an instrument panel of the vehicle. The operation unit 100 includes an air supply button for expanding the first air bag 41, an exhaust button for contracting the first air bag 41, and a start/end button for starting or ending the massage using the second air bags 42.

Control Unit 110

The control unit 110 includes a processing circuit including a computer and a memory, and the like. The control unit 110 controls the pump 30, the switching valve 61, the auxiliary valve 62, and the plurality of regulating valves 63 on the basis of the program stored in the memory and an operation signal output according to the operation content of the operation unit 100. Specifically, in a case where the air supply button is operated, the control unit 110 energizes the switching valve 61 in addition to driving the pump 30. In a case where the exhaust button is operated, the control unit 110 energizes the auxiliary valve 62. In a case where the start/end button is operated, the control unit 110 starts the massage operation. Specifically, in the massage operation, in addition to driving the pump 30, the control unit 110 periodically switches the plurality of regulating valves 63 between the energized state and the non-energized state. In a case where the start/end button is operated during the massage operation, the control unit 110 ends the massage operation. Specifically, the control unit 110 stops energizing the plurality of regulating valves 63 in addition to stopping the drive of the pump 30.

Action of Present Embodiment

The action of the air supply device 20 will be described.

First, an action at the time when the user adjusts the seating posture with respect to the vehicle seat 10 in a situation where the first air bag 41 is contracted will be described.

In the case of the user adjusting the seating posture with respect to the vehicle seat 10, the user operates the air supply button of the operation unit 100. Then, the pump 30 is driven, and the switching valve 61 is energized. At this time, the switching valve 61 connects the supply flow channel 51 to the first upstream flow channel 52U, and the auxiliary valve 62 connects the first downstream flow channel 52D to the first upstream flow channel 52U. Therefore, the air delivered from the pump 30 is supplied to the first air bag 41 through the supply flow channel 51 and the first flow channel 52. As a result, the first air bag 41 gradually expands.

Here, in a case where the air is supplied from the pump 30 toward the first air bag 41, the air flows through the internal flow channel 71 of the pressure reducing joint 70. Because the internal flow channel 71 is connected to the exhaust flow channel 72, a part of the air flowing through the internal flow channel 71 is discharged to the atmosphere via the exhaust flow channel 72. As a result, in the pressure reducing joint 70, the outflow amount of air becomes smaller than the inflow amount of air. In this way, the pressure reducing joint 70 reduces the pressure of the air supplied from the pump 30 toward the first air bag 41. Therefore, even if the user continues to press the air supply button, the internal pressure of the first air bag 41 does not continue to increase. Assuming that the maximum value of the internal pressure of the first air bag 41 at this time is a set pressure, the set pressure changes depending on the flow channel cross-sectional area of the exhaust flow channel 72 of the pressure reducing joint 70. Therefore, the specification of the pressure reducing joint 70 is preferably determined according to the pressure resistance of the first air bag 41 and the like.

Thereafter, when the user stops operating the air supply button of the operation unit 100, the driving of the pump 30 is stopped, and the switching valve 61 is not energized. Immediately after the user stops operating the air supply button of the operation unit 100, the internal pressure of the first upstream flow channel 52U on the upstream side of the check valve 64 is higher than the atmospheric pressure. At this time, the force acting on a valve body of the switching valve 61 according to the internal pressure of the first upstream flow channel 52U tends to become larger than the force acting on a valve body of the switching valve 61 according to the amount of deformation of the spring of the switching valve 61. Therefore, the state of the switching valve 61 is difficult to return to the state before energization. However, the first upstream flow channel 52U is connected to the atmosphere via the exhaust flow channel 72 of the pressure reducing joint 70. Therefore, as time passes, the internal pressure of the first upstream flow channel 52U on the upstream side of the check valve 64 gradually decreases to the atmospheric pressure. In this way, the state of the switching valve 61 returns to the state before energization after some time has passed from the time when the user stops operating the air supply button of the operation unit 100. That is, the switching valve 61 connects the supply flow channel 51 to the second flow channel 53. Meanwhile, in the first upstream flow channel 52U, the pressure on the downstream side of the check valve 64 becomes larger than the pressure on the upstream side. Therefore, the check valve 64 restricts the flow of air from the auxiliary valve 62 toward the pressure reducing joint 70.

In a case where the user operates the air supply button of the operation unit 100 too long, there is a case where the first air bag 41 is excessively inflated. In this case, the user operates the exhaust button of the operation unit 100. Then, the auxiliary valve 62 connects the first downstream flow channel 52D to the atmosphere. Therefore, the air flows out from the first air bag 41 toward the atmosphere. When the expansion of the first air bag 41 becomes appropriate, the user stops the operation of the exhaust button of the operation unit 100. Then, the auxiliary valve 62 connects the first downstream flow channel 52D to the first upstream flow channel 52U. That is, the air does not flow into the first air bag 41 or the air does not flow out from the first air bag 41. Note that, in a case where the first air bag 41 is excessively contracted, the user only needs to operate the air supply button of the operation unit 100.

Next, an action of the air supply device 20 at the time of massaging the body of the user will be described.

The user starts the massage operation by operating the start/end button of the operation unit 100. That is, the pump 30 is driven, and periodic energization to the plurality of regulating valves 63 is started. The energized regulating valve 63 connects the corresponding second downstream flow channel 53D to the second upstream flow channel 53U. Therefore, the air delivered from the pump 30 is supplied to the corresponding second air bag 42 through the supply flow channel 51 and the second flow channel 53. As a result, the second air bag 42 gradually expands. The regulating valve 63 that is not energized connects the corresponding second downstream flow channel 53D to the atmosphere. Therefore, the air flows out from the corresponding second air bag 42 to the atmosphere, and the corresponding second air bag 42 gradually contracts. In this way, during the massage operation, the body of the user is massaged by the plurality of second air bags 42 repeatedly expanding and contracting.

The user ends the massage operation by operating the start/end button of the operation unit 100 again. That is, the driving of the pump 30 is stopped, and the plurality of regulating valves 63 are no longer energized.

Effects of Present Embodiment (1) The air supply device 20 can expand the first air bag 41 by delivering air to the first air bag 41 by the pump 30. The first flow channel 52 connecting the pump 30 to the first air bag 41 is connected to the exhaust flow channel 72 of the pressure reducing joint 70. Therefore, the flow rate of the air flowing from the pump 30 to the first air bag 41 is adjusted by the air being discharged from the exhaust flow channel 72. Accordingly, the air supply device 20 can adjust the amount of supplied air to the first air bag 41 with a simple configuration. In addition, in the pressure reducing joint 70, the exhaust flow channel 72 constantly connects the internal flow channel 71 to the outside air. Therefore, the pressure reducing joint 70 has a simple structure as compared with a pressure reducing valve or the like.

(2) In the air supply device 20, in the case of the supply of air from the pump 30 to the first air bag 41 being completed, the internal pressure of the first upstream flow channel 52U on the upstream side of the check valve 64 becomes higher than the atmospheric pressure. If this state continues, there is a risk that a load is applied to the tube constituting the first upstream flow channel 52U or a load is applied to the switching valve 61. In this respect, in the air supply device 20, the first upstream flow channel 52U is connected to the exhaust flow channel 72 of the pressure reducing joint 70. Therefore, the internal pressure of the first upstream flow channel 52U on the upstream side of the check valve 64 gradually decreases. In this way, the air supply device 20 can suppress the load from being applied to the tube constituting the first upstream flow channel 52U or the load being applied to the switching valve 61.

(3) In the pressure reducing joint 70, the opening edge 721 of the exhaust flow channel 72 on the atmosphere side is rounded. Therefore, the air supply device 20 can suppress the sound generated by the air discharged from the exhaust flow channel 72 as compared with the case where the corner of the opening edge 721 on the atmosphere side of the exhaust flow channel 72 is sharp-edged.

(4) In a case where the flow channel cross-sectional area of the exhaust flow channel 72 is larger than the flow channel cross-sectional area of the internal flow channel 71, most of the air delivered by the pump 30 is discharged from the exhaust flow channel 72 of the pressure reducing joint 70. In this respect, in the air supply device 20, the flow channel cross-sectional area of the exhaust flow channel 72 is smaller than the flow channel cross-sectional area of the internal flow channel 71. Therefore, the air supply device 20 can suppress the amount of inflow air into the first air bag 41 from becoming too small.

(5) In the pressure reducing joint 70, the main body 73 having the exhaust flow channel 72 is recessed further toward the internal flow channel 71 than the first base 74 and the second base 75 adjacent to the main body 73 in the axial direction. Therefore, in the direction orthogonal to the axial direction, the thickness T1 of the wall constituting the main body 73 is smaller than the thickness T2 of the walls constituting the first base 74 and the second base 75. Therefore, in the air supply device 20, the length of the exhaust flow channel 72 is shortened because the thickness T1 of the wall of the main body 73 where the exhaust flow channel 72 is opened can be reduced. Therefore, the air supply device 20 can efficiently discharge the air via the exhaust flow channel 72 of the pressure reducing joint 70.

Modifications

The present embodiment can be modified and implemented as follows. The present embodiment and the following modifications can be implemented in combination with each other within a range not technically contradictory.

The shape of the pressure reducing joint 70 can be changed as appropriate. For example, the main body 73 may have a columnar shape with the axial direction as the height direction. Similarly, in the pressure reducing joint 70, the first base 74 and the second base 75 may have a disk shape with the axial direction as the height direction.

In a direction orthogonal to the axial direction of the pressure reducing joint 70, the main body 73 may not be recessed toward the internal flow channel 71 with respect to the first base 74 and the second base 75. In this case, the exhaust flow channel 72 may be open to the first base 74 or may be open to the second base 75.

In the pressure reducing joint 70, the cross-sectional shapes of the internal flow channel 71 and the exhaust flow channel 72 may not be circular. For example, the cross-sectional shapes of the internal flow channel 71 and the exhaust flow channel 72 may be rectangular.

In the pressure reducing joint 70, the opening of the exhaust flow channel 72 may not be rounded. For example, the opening edge 721 of the exhaust flow channel 72 may be sharp-edged.

In the pressure reducing joint 70, the flow channel cross-sectional area of the internal flow channel 71 may be equal to or smaller than the flow channel cross-sectional area of the exhaust flow channel 72. In this case, the pressure reducing joint 70 can significantly reduce the pressure of the air flowing from the pump 30 toward the first air bag 41. Such a pressure reducing joint 70 can be said to be suitable in a case where it is desired to weakly pressurize the first air bag 41 and strongly pressurize the second air bag 42.

The air supply device 20 may not include the configuration related to the second air bag 42. That is, the air supply device 20 may be configured to only include the configuration related to the first air bag 41.

The air supply device 20 may be applied to a massage chair installed in a house, a facility, or the like.

Summary of Present Embodiment

The present embodiment includes at least the following configuration.

An air supply device (20) of the present embodiment supplies air to an air bag (41). The air supply device (20) includes a pump (30) that delivers air, a connecting flow channel (50) that connects the pump (30) to the air bag (41), and a pressure reducing joint (70) that reduces pressure of air supplied from the pump (30) to the air bag (41). The pressure reducing joint (70) includes an internal flow channel (71) constituting a part of the connecting flow channel (50), and an exhaust flow channel (72) that constantly connects the internal flow channel (71) to the atmosphere and discharges a part of the air flowing through the internal flow channel (71) to the atmosphere.

The air supply device can expand the air bag by delivering air to the air bag by the pump. The connecting flow channel connecting the pump to the air bag is connected to the exhaust flow channel of the pressure reducing joint. Therefore, the flow rate of the air flowing from the pump to the air bag is adjusted by the air being discharged from the exhaust flow channel. Accordingly, the air supply device can adjust the amount of supplied air to the air bag with a simple configuration.

In the present embodiment, the connecting flow channel (50) preferably includes a supply flow channel (51) having an upstream end connected to the pump (30), a first flow channel (52) including the internal flow channel (71) and having a downstream end connected to the air bag (41), and a second flow channel (53) having a downstream end connected to an air supply target (42) different from the air bag (41). The air supply device (20) further preferably includes: a switching valve (61) that is connected with a downstream end of the supply flow channel (51), an upstream end of the first flow channel (52), and an upstream end of the second flow channel (53), and switches a connection destination of the supply flow channel (51) to one of the first flow channel (52) and the second flow channel (53); and a check valve (64) that is provided between the pressure reducing joint (70) and the air bag (41) in the first flow channel (52), and restricts a flow of air from the air bag (41) toward the pressure reducing joint (70) while allowing a flow of air from the pressure reducing joint (70) toward the air bag (41).

In the air supply device, in the case of the supply of air from the pump to the air bag being completed, the internal pressure of the first flow channel on the upstream side of the check valve becomes higher than the atmospheric pressure. If this state continues, there is a risk that the load is applied to the components constituting the first flow channel or the load is applied to the switching valve. In this respect, in the air supply device having the above configuration, the first flow channel is connected to the exhaust flow channel of the pressure reducing joint. Therefore, the internal pressure of the first flow channel on the upstream side of the check valve gradually decreases. In this way, the air supply device can suppress the load from being applied to the components of the first flow channel or the load being applied to the switching valve.

In the present embodiment, the exhaust flow channel (72) preferably has an opening edge (721) on the atmosphere side, the opening edge (721) being preferably rounded.

The air supply device can suppress the sound generated by the air discharged from the exhaust flow channel as compared with the case where the corner of the opening edge on the atmosphere side of the exhaust flow channel is sharp-edged.

In the present embodiment, the exhaust flow channel (72) preferably has a flow channel cross-sectional area that is smaller than a flow channel cross-sectional area of the internal flow channel (71).

In a case where the flow channel cross-sectional area of the exhaust flow channel is larger than the flow channel cross-sectional area of the internal flow channel, most of the air delivered by the pump is discharged from the exhaust flow channel of the pressure reducing joint. In this respect, in the air supply device, the flow channel cross-sectional area of the exhaust flow channel is smaller than the flow channel cross-sectional area of the internal flow channel. Therefore, the air supply device can suppress the amount of inflow air into the air bag from becoming too small.

In the present embodiment, the internal flow channel (71) may extend in a direction that is an axial direction of the pressure reducing joint (70). The pressure reducing joint (70) preferably includes a main body (73) having the exhaust flow channel (72), and a first base (74) and a second base (75) located on both sides in the axial direction of the main body (73). The internal flow channel (71) may penetrate the main body (73), the first base (74), and the second base (75). The exhaust flow channel (72) may extend in a direction intersecting the internal flow channel (71). The main body (73) preferably has an exhaust flow channel opening portion where the exhaust flow channel (72) is opened, and the exhaust flow channel opening portion is preferably recessed further toward the internal flow channel (71) than the first base (74) and the second base (75) adjacent to the exhaust flow channel opening portion in the axial direction.

In the air supply device, the length of the exhaust flow channel is shortened because the thickness of the exhaust flow channel opening portion in the main body can be reduced. Therefore, the air supply device can efficiently discharge the air via the exhaust flow channel of the pressure reducing joint.

REFERENCE SIGNS LIST

10: Vehicle seat, 20: Air supply device, 30: Pump, 41: First air bag, 42: Second air bag, 50: Connecting flow channel, 51: Supply flow channel, 52: First flow channel, 52D: First downstream flow channel, 52U: First upstream flow channel, 53: Second flow channel, 53D: Second downstream flow channel, 53U: Second upstream flow channel, 61: Switching valve, 62: Auxiliary valve, 63: Regulating valve, 64: Check valve, 70: Pressure reducing joint, 71: Internal flow channel, 72: Exhaust flow channel, 721: Opening edge. 73: Main body. 74: First base. and 75: Second base

The invention claimed is:

1. An air supply device that supplies air to an air bag, the air supply device comprising:

a pump that delivers air;

a connecting flow channel that connects the pump to the air bag; and a pressure reducing joint that reduces pressure of air supplied from the pump to the air bag, wherein the pressure reducing joint includes an internal flow channel constituting a part of the connecting flow channel, and an exhaust flow channel that constantly connects the internal flow channel to an atmosphere through an opening that is permanently open to the atmosphere and discharges a part of air flowing through the internal flow channel to the atmosphere.

2. The air supply device according to claim 1, wherein the connecting flow channel includes:

a supply flow channel having an upstream end connected to the pump;

a first flow channel including the internal flow channel and having a downstream end connected to the air bag; and a second flow channel having a downstream end connected to an air supply target different from the air bag, the air supply device further comprising:

a switching valve that is connected with a downstream end of the supply flow channel, an upstream end of the first flow channel, and an upstream end of the second flow channel, and switches a connection destination of the supply flow channel to one of the first flow channel and the second flow channel; and a check valve that is provided between the pressure reducing joint and the air bag in the first flow channel, and restricts a flow of air from the air bag toward the pressure reducing joint while allowing a flow of air from the pressure reducing joint toward the air bag.

3. The air supply device according to claim 1, wherein the exhaust flow channel has an opening edge on an atmosphere side, the opening edge being rounded.

4. The air supply device according to claim 1, wherein the exhaust flow channel has a flow channel cross-sectional area that is smaller than a flow channel cross-sectional area of the internal flow channel.

5. The air supply device according to claim 1, wherein the internal flow channel extends in a direction that is an axial direction of the pressure reducing joint, the pressure reducing joint includes a main body having the exhaust flow channel, and a first base and a second base located on both sides in the axial direction of the main body, the internal flow channel penetrates the main body, the first base, and the second base, the exhaust flow channel extends in a direction intersecting the internal flow channel, the main body has an exhaust flow channel opening portion where the exhaust flow channel is opened, and the exhaust flow channel opening portion is recessed further toward the internal flow channel than the first base and the second base adjacent to the exhaust flow channel opening portion in the axial direction.

6. An air supply device that supplies air to an air bag, the air supply device comprising:

a pump that delivers air;

a connecting flow channel that connects the pump to the air bag; and a pressure reducing joint that reduces pressure of air supplied from the pump to the air bag, wherein the pressure reducing joint includes an internal flow channel constituting a part of the connecting flow channel, and an exhaust flow channel that constantly connects the internal flow channel to an atmosphere and discharges a part of air flowing through the internal flow channel to the atmosphere, wherein the air supply device is applicable to a device in which an air bag arranged in a seat repeatedly expands and contracts to adjust a seating posture of a user seated on the seat.

* * * * *